UNITED STATES PATENT OFFICE.

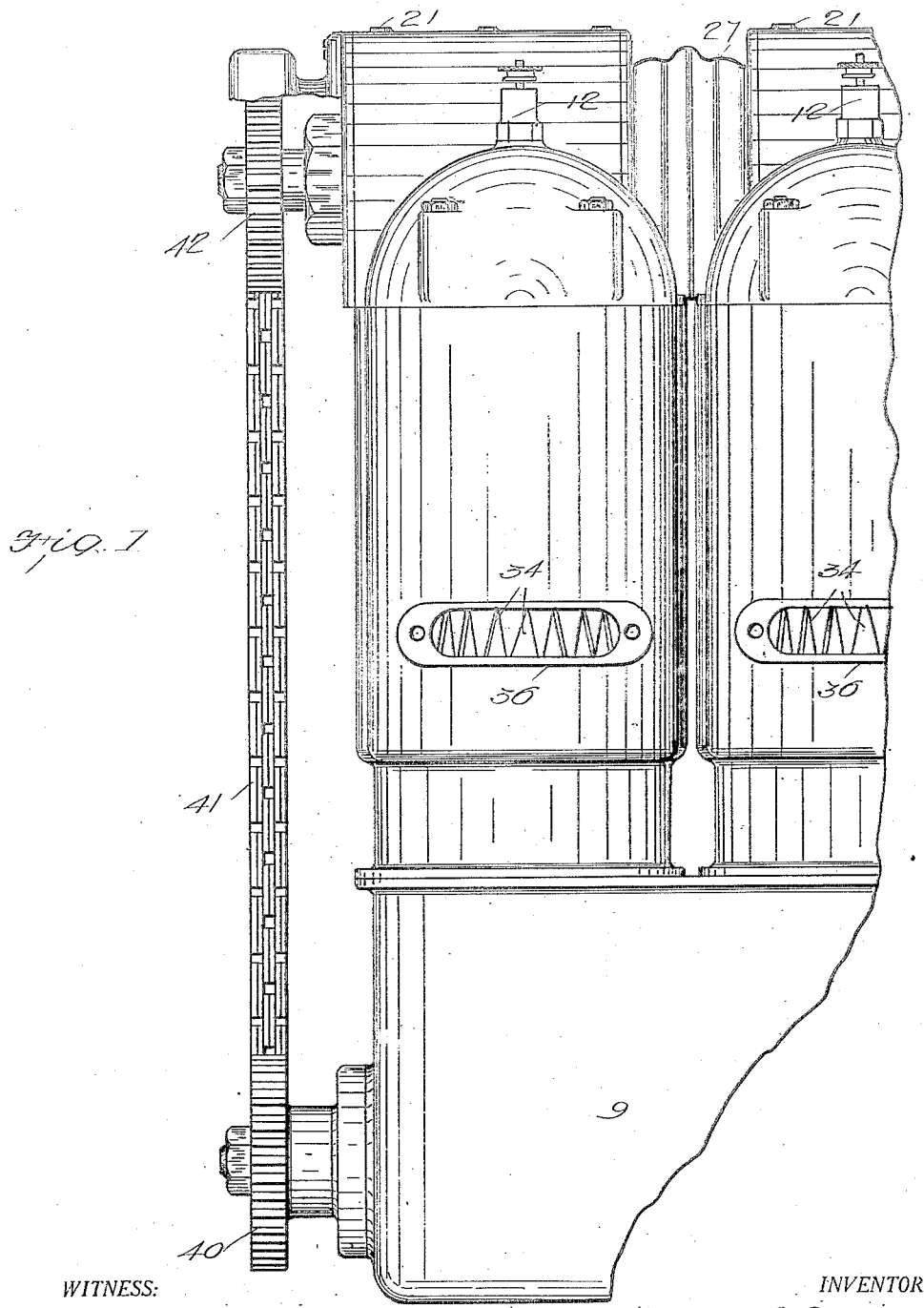

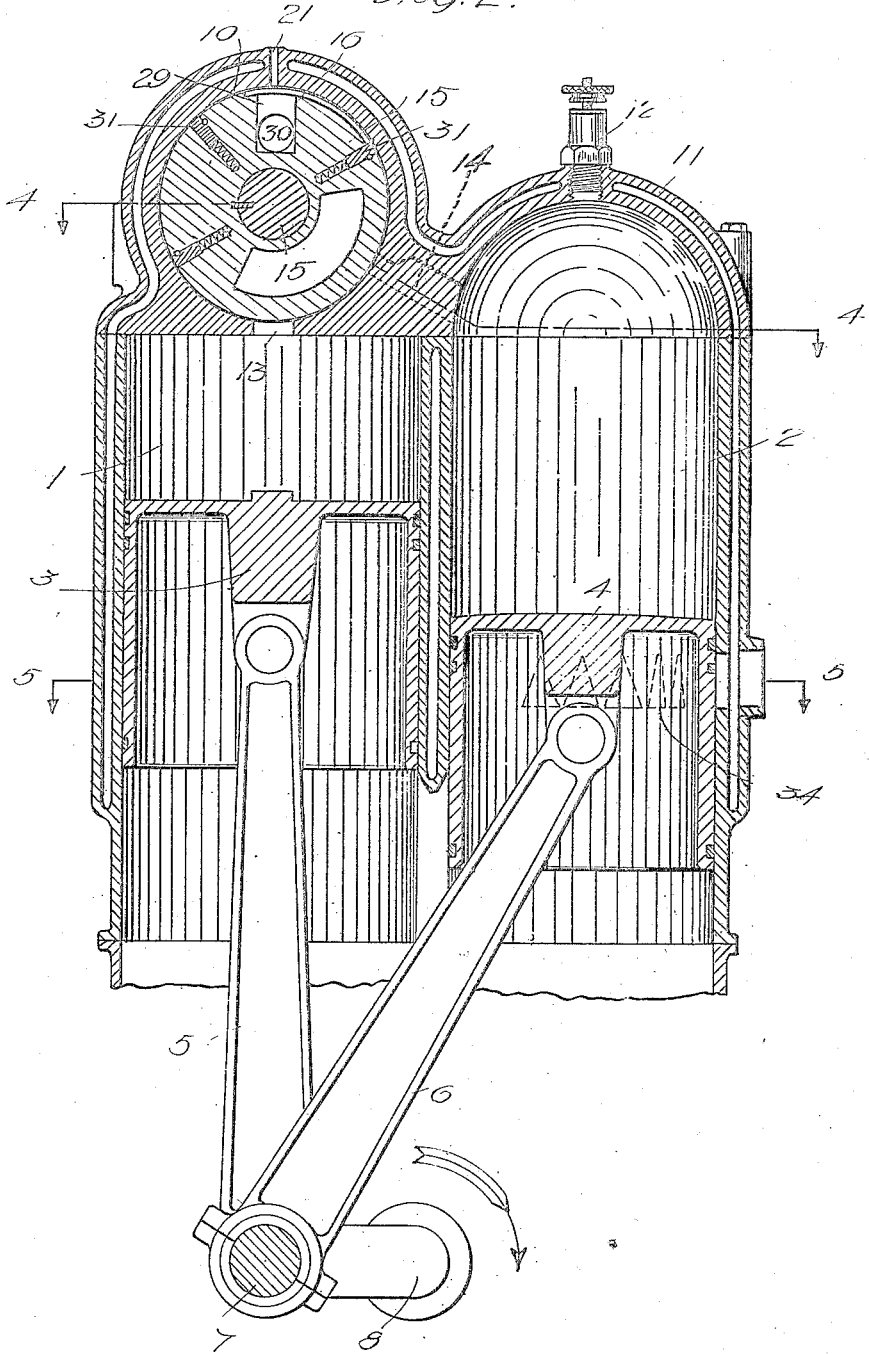

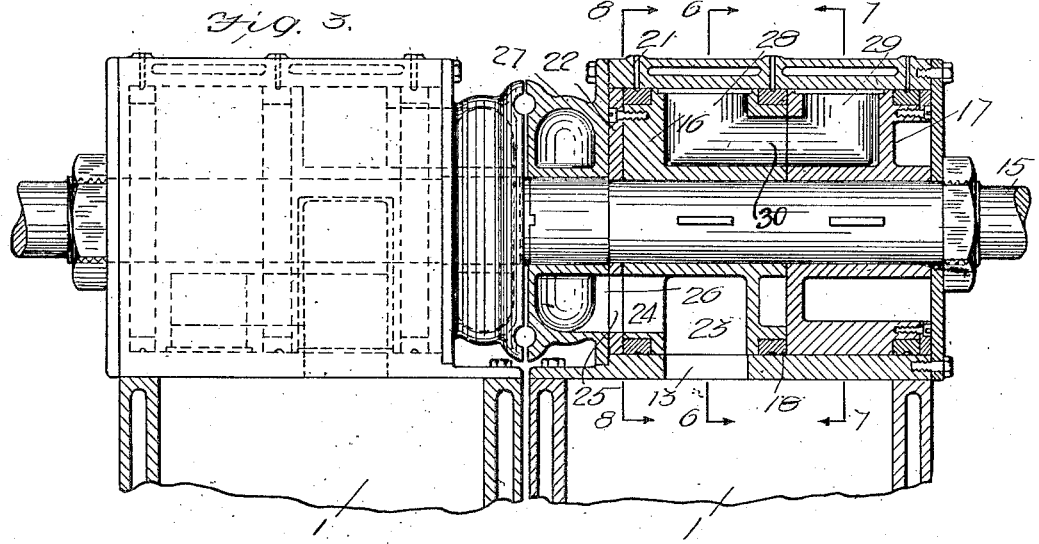
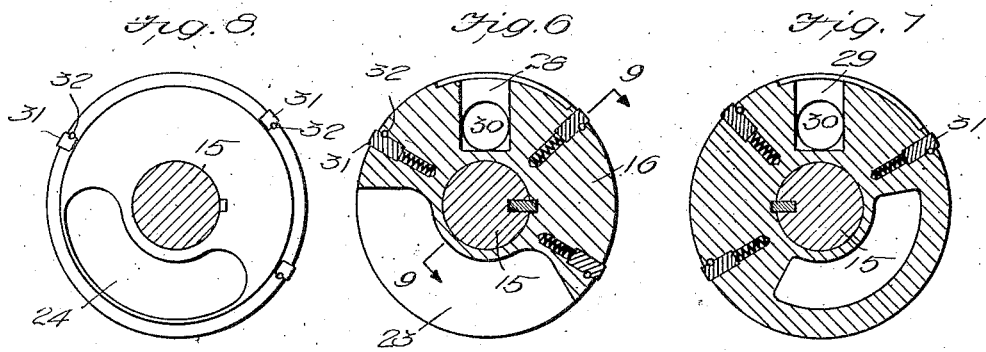
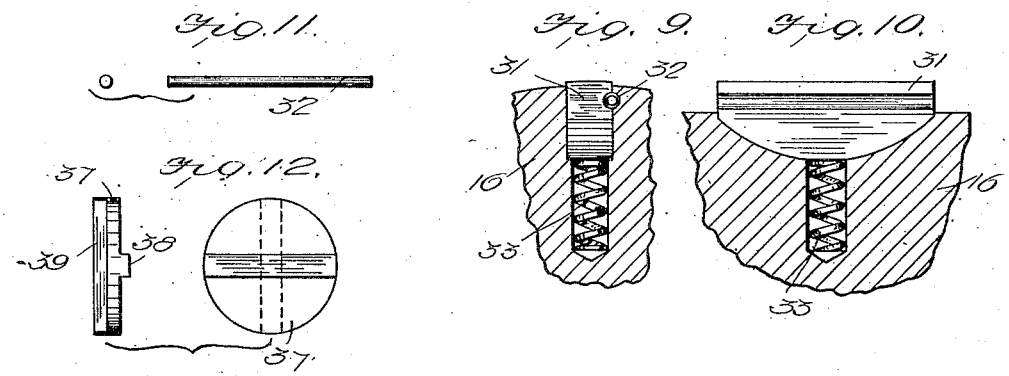

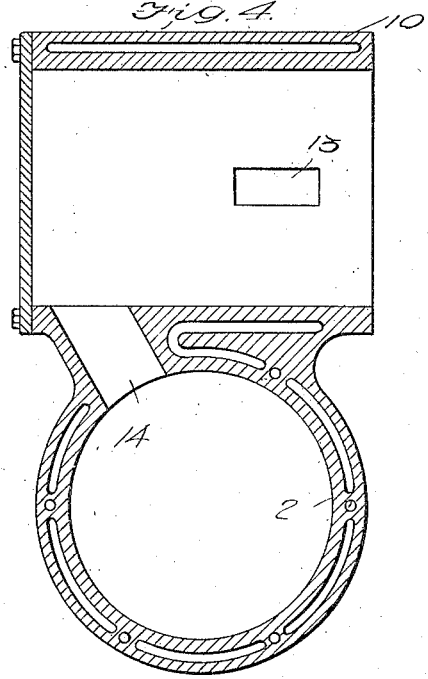
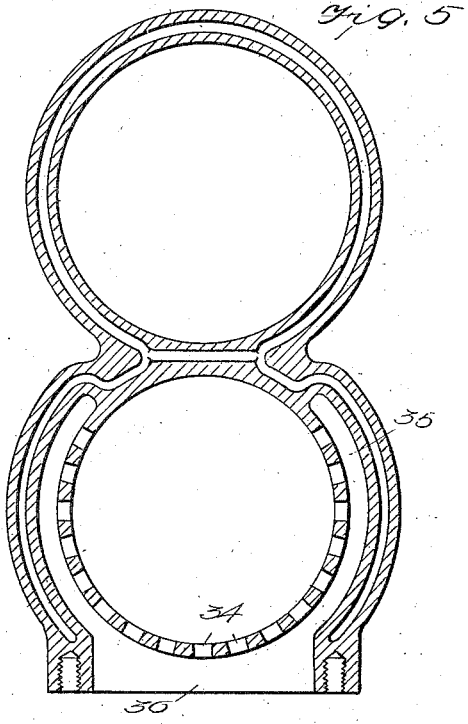
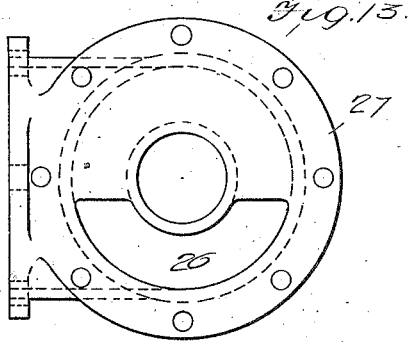
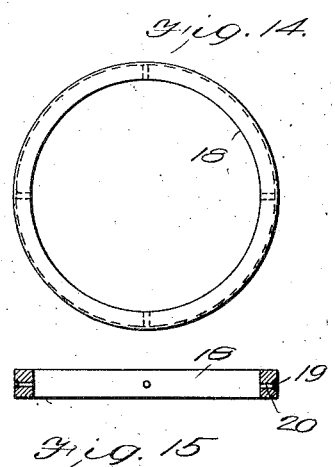

WILLIAM A. SCHAFFER, OF DETROIT, MICHIGAN.

INTERNAL-COMBUSTION ENGINE.

1,411,384. Specification of Letters Patent. Patented Apr. 4, 1922.

Application filed May 1, 1918. Serial No. 231,868.

*To all whom it may concern:*

Be it known that I, WILLIAM A. SCHAFFER, a citizen of the United States, and a resident of Detroit, in the county of Wayne and State of Michigan, have invented certain new and useful Improvements in Internal-Combustion Engines, of which the following is a specification.

My invention is an improvement in internal combustion engines, and has for its object to provide an engine of the character specified, wherein one or more pairs of cylinders is provided, one member of each pair being a working cylinder and the other a compression cylinder, and the pistons of each cylinder are connected to a common crank in such manner that the piston of the compression cylinder will be constrained to move in advance of the piston of the working cylinder at all times, the compression cylinder delivering to the working cylinder at the end of the stroke of the compression cylinder, and wherein a particular form of valve is provided for controlling the admission of the motive fluid and from the compression cylinder and to the working cylinder.

In the drawings:

Figure 1 is a side view of the engine;

Figure 2 is a vertical section;

Figure 3 is a side view, looking in the opposite direction from Figure 1, of the upper portion of the engine, with parts in section;

Figures 4 and 5 are sections on the lines 4—4 and 5—5, respectively, of Figure 2;

Figures 6, 7 and 8 are sections on the lines 6—6, 7—7 and 8—8, respectively, of Figure 3, each view looking in the direction of the arrows adjacent to the line;

Figure 9 is a section on the line 9—9 of Figure 6;

Figure 10 is a detail section at right angles to Figure 9;

Figure 11 is an end and side view of the retaining pin;

Figure 12 is an end and side view of the locking disk for the valve rod sections;

Figure 13 is an end view of the fuel chamber;

Figure 14 is a side view of one of the cylinder rings;

Figure 15 is a diametrical section of one of the said rings.

In the present embodiment of the invention, one or more pairs of cylinders is provided, one member 1 of each pair being a compression cylinder and the other member 2 of the pair being the working cylinder. Pistons 3 and 4 move in the respective cylinders, and each piston of the two cylinders of the pair is connected by a piston rod 5 and 6 with a common crank 7 on the crank shaft 8.

This shaft, as shown, is arranged directly between the cylinders, that is, at equal distances from the prolonged axes of the cylinders and it rotates in the direction of the arrow in Figure 2. Because of this arrangement it will be evident that the piston 3 will always move in advance of the piston 4, reaching the end of its compression stroke shortly before the piston 4 reaches the end of its outward stroke.

The cylinders abut at one end the crank case 9 and at its outer end the cylinder 1 has a valve casing 10, while the cylinder 2 has a dome shaped head 11, which carries a spark plug 12. The dome shaped head and the valve casing are both jacketed, as shown, the interior of the jacket communicating with the jackets of the cylinders, and it will be noticed that this head and casing are of integral construction.

The interior or bore of the valve is cylindrical, and ports 13 and 14 provide communication between the cylinder 1 and the valve casing, and between the valve casing and the cylinder 2. The valve is substantially cylindrical and is keyed to a shaft 15, as shown. This valve is sectional, consisting of sections 16 and 17 which are abutted end to end, as shown. The section 16 of the valve has an annular rabbet at each end for receiving a sealing ring.

The section 17 of the valve is rabbeted at the end remote from the section 15 for a similar purpose. The sealing rings are fitted closely into the valve casing, and turn in the rabbets of the valve. Each ring, as shown more particularly in Figure 15, has a peripheral annular groove 19, and radial openings 20 lead from the groove of each ring to the interior surface of the ring. The valve casing has lubricating openings 21 which register with the grooves 19, so that the lubricant can pass through the openings 21 into the groove and through the radial openings to lubricate the abutting surfaces of the rings and valves. The central ring is held in place by the abutting ends of the valve sections, and the end rings are held in place by disks or heads 22 which are secured to the ends of the valve.

Referring to Figure 3, it will be noticed that the valve section 16 has a radial port 23 which is adapted to register with the port 13 of the compression cylinder, and this port communicates by way of a passage 24 at the end of the valve and by way of an opening 25 and a port 26 with the interior of a fuel chamber 27 which is secured to the end of the valve casing. Thus when the valve is in the position of Figure 3, with the port 23 in register with the port 13, the port 24 will register with the ports 25 and 26, and the mixture may be drawn into the compression cylinder from the carbureter which is connected to the fuel chamber 27 in any suitable or desired manner.

Each section 16 and 17 of the valve has a port 28 and 29, respectively, these ports being radial and being connected by a passage 30 extending longitudinally of the sections. When the port 28 is in register with the port 13, the port 29 will register with the port 14, and the compression piston may drive the compressed charge from the cylinder 1 to the cylinder 2. In order that there may be a perfect seal for the cylinder 1 on each side of the port 13 when the charge is being compressed and for the cylinder 2 when the charge is fired, each section of the valve has radially movable lonigtudinally extending abutments 31, said abutments extending between the rings 18. These abutments 31, as shown, are seated in recesses in the valve, the inner edge of each abutment being rounded, and the recess being rounded to fit the same, and the abutments are held from accidental displacement by means of pins 32 which engage registering grooves in the abutments and in the recess wall, the said grooves forming a passage which is of greater diameter than the pin, so that some movement of the abutments is permitted. A coil spring 33 is arranged beneath each abutment at the center thereof in a recess in the valve, and these springs act normally to hold the abutments in vertical position and in close contact with the interior of the valve chamber.

Referring to Figures 6, 7, and 8 it will be observed that these abutments are arranged at angles of approximately ninety degrees with respect to each other, an abutment being arranged on each side of each port 28 and 29, and an abutment on each side of the port 23. Thus there is always a seal on each side of each port. The exhaust is by way of a series of triangular openings 34 which lead from the interior of the cylinder to an arc shaped exhaust passage 35 which partially encircles the cylinder, being formed by an outwardly bent portion of the cylinder wall, and this arc shaped passage communicates with the atmosphere by means of a port 36. When more than a pair of cylinders is used, they are arranged as shown in Figures 1 and 3, the axes of the members of each pair being in the same plane transversely of the crank shaft, and with the pairs arranged alongside each other.

The valve shafts are coupled together by the disk 37 shown in Figure 12. This disk has ribs 38 and 39 on its opposite faces, the ribs being at right angles to each other, and each end of the shaft has a diametrical groove for receiving the adjacent rib. The crank shaft has a sprocket wheel 40 which is connected by a chain 41 with a sprocket wheel 42 on the outer end of the adjacent valve shaft section and the valve is thus driven from the crank shaft. It will be noticed by referring to Figure 2 that the common wall between the cylinders 1 and 2 is cut away adjacent to the crank shaft to permit the movement of the piston rods.

In operation, when the crank passes over the dead center at the top of the crank shaft, the piston 3 begins to move downward and at this moment the valve is in the position of Figure 3, that is, with the port 23 in register with the port 13, and a charge of fuel is drawn into the cylinder 1. The cylinder 2 is on its working stroke at this time, and as soon as the piston passes the exhaust ports, the gases of combustion are immediately discharged. As the piston 3 begins to move upwardly, the charge is compressed, and at the proper moment during the upward movement of the piston the valve is moved to bring the ports 28 and 29 into register with the ports 13 and 14, and the compressed charge is driven out into the cylinder 2 which at this time affords larger capacity than the cylinder 1, that is, the compressed fuel flows into a chamber of increased capacity and with lessened pressure. At the point when the crank is on the dead center above the shaft the charge is ignited, again moving the piston 4 on its working stroke.

It will be observed that the fuel is passed from the compression chamber to the working chamber under high compression, the valve releasing the charge when it is under highest compression. With this arrangement, due in part to the perfect seal obtained between the valve chamber and the compression chamber and between the valve chamber and the explosion chamber fuel is thoroughly mixed and dried so that there are no large particles of gas or unvaporized fuel, the entire mixture being in homogeneous nebular form. With this arrangement, the highest possible efficiency is obtained, all of the charge being converted into driving force so that at the highest speed there is no issue of flame from the exhaust. When a charge is drawn into the compression chamber the inlet port is thoroughly sealed during compression, first by the moving out of register of the ports 23 and 13 and second by the moving out of register of the port 23 with the port 25. Should there be escape of pressure at the port 13, this pressure will be held at the port 24 and by the rings 18.

I claim:

1. An internal combustion engine comprising a compression cylinder and a working cylinder arranged in parallel relation to said compression cylinder, pistons in said cylinders, a crank shaft arranged an equal distance between the longitudinal axis of said working cylinder and the longitudinal axis of said compression cylinder, piston rods connecting said crank shaft to said pistons, the piston in said compression cylinder being movable in advance of the piston in the working cylinder on the out stroke of the pistons, said working cylinder being provided with an arc shaped exhaust chamber having a series of ports communicating with the working cylinder.

2. An internal combustion engine comprising a compression cylinder and a working cylinder arranged in parallel relation to said compression cylinder, pistons in said cylinders, a crank shaft arranged an equal distance between the longitudinal axis of said working cylinder and the longitudinal axis of said compression cylinder, piston rods connecting said crank shaft to said pistons, the piston in said compression cylinder being movable in advance of the piston in the working cylinder on the out stroke of the pistons, said working cylinder being provided with an arc shaped exhaust chamber having a series of ports communicating with the working cylinder, and means arranged at the upper end of said compression cylinder for controlling communication between said working and compression cylinders and for supplying said compression cylinder with fuel, the upper end of said working cylinder being extended beyond the upper end of the compression cylinder and arranged at one end of said means.

WILLIAM A. SCHAFFER.